United States Patent [19]

Pescetto

[11] Patent Number: 4,992,632
[45] Date of Patent: Feb. 12, 1991

[54] VACUUM VALVE/SWITCH ASSEMBLY
[75] Inventor: James R. Pescetto, Springfield, Ill.
[73] Assignee: Stewart Warner Hobbs Corporation, Springfield, Ill.
[21] Appl. No.: 365,093
[22] Filed: Jun. 12, 1989
[51] Int. Cl.$^5$ .............................................. H01H 9/06
[52] U.S. Cl. .................................................. 200/61.86
[58] Field of Search ............... 200/61.86, 61.89, 81 R, 200/81.5; 137/554, 560; 251/318, 322, 323

[56] References Cited
U.S. PATENT DOCUMENTS 3,856,045  12/1974  Kenny et al. .................. 200/61.86 X
4,192,399   3/1980  Otteson et al. ............... 200/61.86 X Primary Examiner—J. R. Scott
Attorney, Agent, or Firm—Lorusso & Loud

[57] ABSTRACT

A vacuum valve/switch assembly is presented. The switch is a combination of an electrical switch assembly and a vacuum dump valve, which operates in a predetermined sequence. The switch consists of a brass ferrule and two cantilever spring contact legs, identical to the existing cruise control brake switches. The vacuum valve consists of an "O" ring in a groove on a floating valve stem. The floating action of the stem permits the "O" ring to center itself in the valve seat. The "O" ring seals by virtue of a compressing spring and the pressure gradient created by the vacuum.

1 Claim, 2 Drawing Sheets

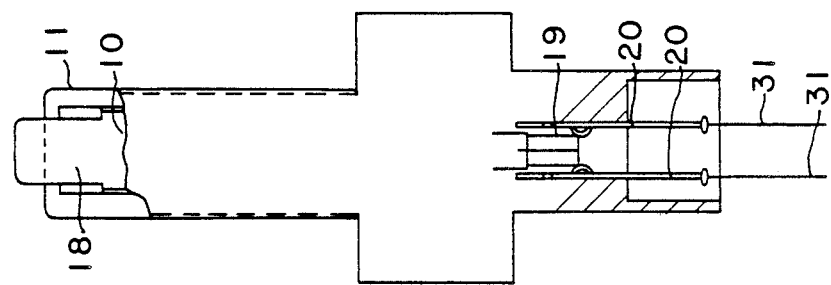
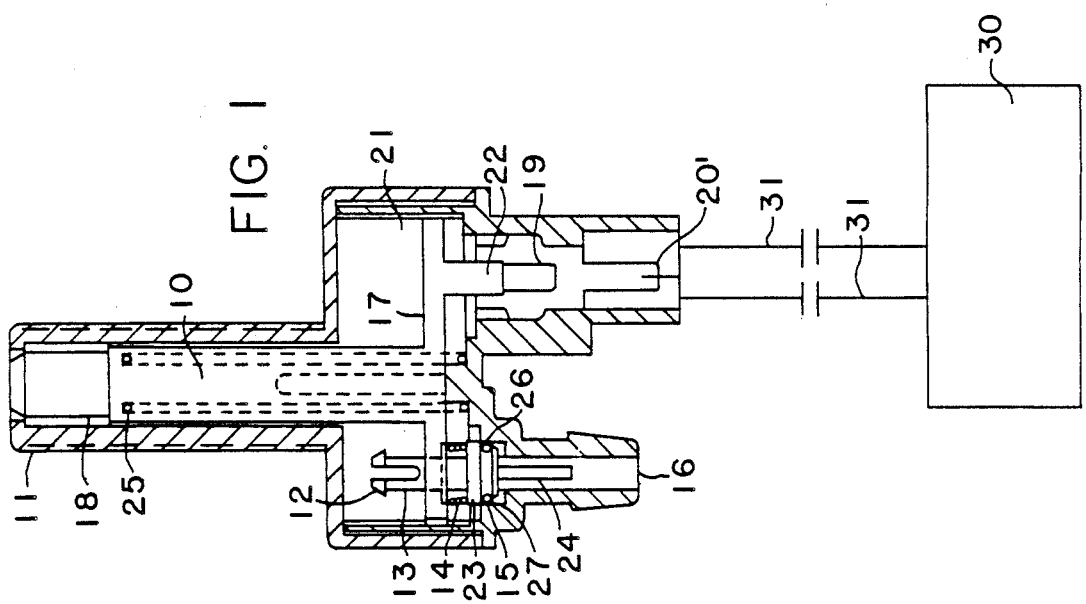

VACUUM VALVE/SWITCH ASSEMBLY

BACKGROUND OF THE INVENTION

This invention relates to a vacuum valve switch assembly which operates in a predetermined sequence.

In certain applications, particularly in motor vehicles, it is necessary that an actuating member of a switch is in engagement with a brake pedal of a motor vehicle when the brakes are not applied and the activating member is not in engagement with the pedal when the brake pedal is depressed to apply the brakes of the vehicle. Such a switch is required for cruise control and torque converter clutch applications. When an automobile is put in the cruise control mode, the accelerator pedal is modulated by a computer control which automatically adjusts the accelerator pedal to propel the car at a constant velocity. However, as soon as the brake pedal is depressed, it is necessary that the cruise control mechanism be released thereby releasing the accelerator pedal.

Existing devices used in this application utilize an "O" ring which slides in a bore. The problems in this area are wear on the "O" ring in the bore which results in either vacuum leakage or increased functional forces, which result in sticking plungers and field failures. Such a failure is extremely dangerous if the cruise control mechanism is not released.

The following summary details a device which solves this problem.

SUMMARY OF THE INVENTION

The present invention is a combination of an electrical switch assembly and a vacuum dump valve, which must operate in a predetermined sequence. The switch consists of a brass ferrule and two cantilever spring contact legs, identical to existing cruise control brake switches. The vacuum valve consists of an "O" ring in a groove on a floating valve stem. The floating action of this stem permits the "O" ring to center itself in the valve seat. The "O" ring seals by virtue of a compression spring and the pressure gradient created by the vacuum.

It is therefore an object of the present invention to provide an electrical switch with a vacuum dump valve wherein the vacuum dump valve has a movable "O" ring.

Another object of the present invention is to provide a vacuum valve wherein an "O" ring is movable from one position to a second position but yet does not wear out due to the moving action.

Yet another object of the present invention is to provide an vacuum valve assembly which functions with a wide range of "O" rings.

These and other features and objects of the present invention will be more fully understood from the following detailed description which should be read in light of the accompanying drawings in which corresponding reference numerals refer to corresponding parts throughout the several views.

BRIEF DESCRIPTION OF THE DRAWINGS

FIG. 1 shows a cross-sectional view of the electrical switch assembly and vacuum dump valve of the present invention.

FIG. 2 shows a partially cut-away front view of the electrical switch assembly and vacuum dump valve of the present invention.

DESCRIPTION OF THE PREFERRED EMBODIMENTS

Figure 4:
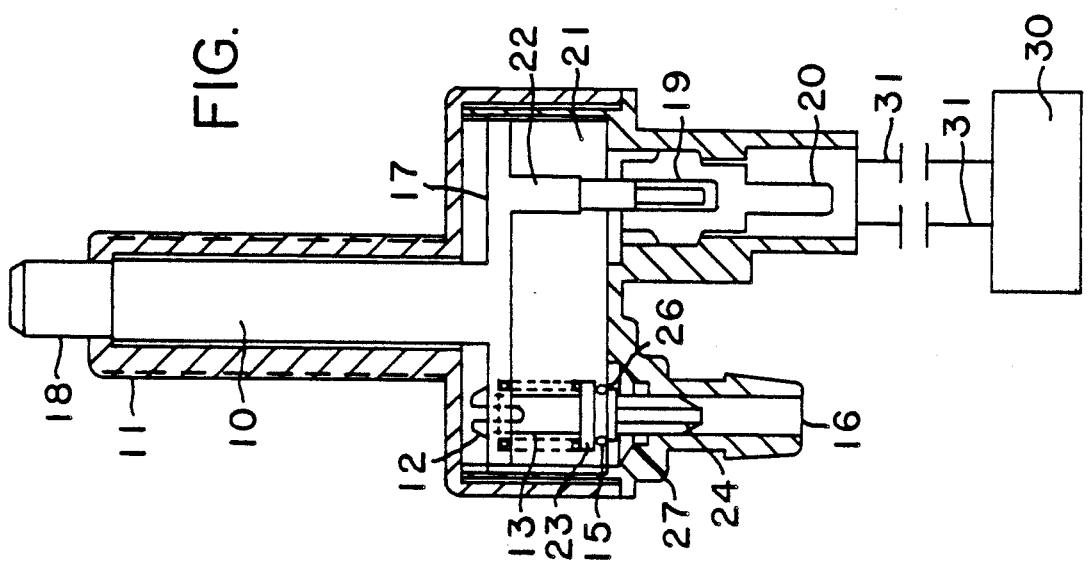
FIG. 4 shows a cross-sectional view of the electrical switch assembly and vacuum dump valve with the plunger fully released and the vacuum port fully opened.

The present invention is a combination electrical switch assembly and vacuum dump valve for releasing cruise control on automobiles. The switch is constructed such that there are two possible ways to release the cruise control, one through an adjacent electrical switch contact and a second through a vacuum port. The device is detailed below.

Shown in FIG. 1 is a cross-sectional view of the combination vacuum valve/switch assembly of the present invention. This switch is mounted in a manner such that the plunger 10 is depressed by the brake pedal when the brake pedal is not depressed. When the brake pedal is pressed the plunger 10 is allowed to extend out of the housing 11.

The vacuum valve/switch assembly consists of a plunger 10 which rests against the stem of a brake pedal. Plunger 10 consists of plunger extension 18, plunger base 17, and plunger base extension 22. This plunger is urged forward or out of the main housing 11 by plunger spring 25. Attached to plunger 10 at plunger base extension 22 is a brass ferrule 19. This brass ferrule makes contact with cantilever spring contact legs 20 to open and close torque converter clutch circuit 30. This set up is shown more clearly in FIG. 2. The electrical switch/vacuum valve assembly also requires a vacuum port 16. This vacuum port is sealed off through "O" ring 15 and valve stem 13. Valve stem 13 consists spring base 23, valve guide 24, valve stem wings 12, and "O" ring groove 26. Valve spring 14 is attached to spring base 23 and plunger base 17. The "O" ring 15 is urged to seal by the force of spring 14 against spring base 23 and the pressure gradient, since the pressure gradient is defined as the difference between the pressure of housing cavity 21 and the pressure of vacuum port 16, and the vacuum port is the low pressure side of the vacuum valve 1 switch assembly. When the electrical switch/vacuum valve assembly is in the position shown in FIG. 1, one is able to set the cruise control on an automobile.

FIG. 2 shows a partially cut-away side view of the electrical switch vacuum valve assembly of the present invention. In FIG. 2 one can see more clearly the cantilever spring contact legs 20 and how they make contact with the brass ferrule 19. When the brass ferrule 19 and cantilever spring contact legs make contact, the torque converter clutch (not shown) can be implemented. In FIG. 2, the plunger is slightly released due to a driver depressing the brake pedal slightly. As the brake pedal is depressed, plunger 10 is urged forward by the action of plunger spring 25. As this occurs, brass ferrule 19 no longer contacts the cantilever spring contact legs 20 and the torque converter clutch circuit opens up. When this occurs, the torque converter clutch releases because this circuit releases. However, in this situation where a switch is controlling the cruise control circuit, it is industry practice to provide a back-up fail-safe system.

Figure 3:
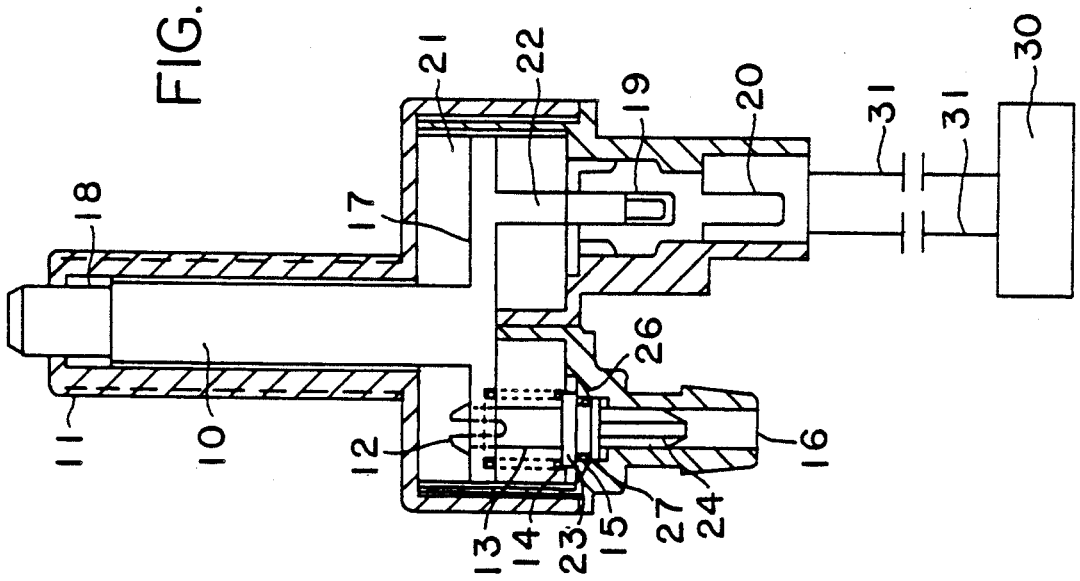
FIG. 3 shows a cross-sectional view of the electrical switch assembly and vacuum dump valve with the vacuum port beginning to open.

The fail-safe system provided in this electrical switch/vacuum valve assembly of the present invention is seen more clearly in FIGS. 3 and 4. FIG. 3 shows the plunger 10 half way extended. At this point the plunger base 17 is in contact with valve stem wings 12. In FIG. 4 when the plunger is fully extended, the plunger base 17 has come in contact with the valve stem wings 12 and urged the valve stem in the upward direction. This releases the vacuum port 16. When the vacuum port is released, the cruise control mechanism is disconnected. Thus, if the electrical contact in the adjacent switch did not break as it was designed, the opening of the vacuum port would provide a back-up to release the cruise control. When the switch is in the position shown in FIG. 4, it is impossible for one to engage the cruise control due to the fact that the vacuum port 16 is open.

The advantage of the electrical switch/vacuum valve assembly shown is that the "O" ring rests in groove 26 on valve stem 13. The valve stem 13 "floats" and allows the "O" ring to center itself in the valve seat 27. This design is an improvement over existing devices used in this application wherein an "O" ring slides in a bore. The problems of having the "O" ring slide in a bore are that the "O" ring wears very quickly which results in vacuum leakage. When vacuum leakage occurs, the cruise control mechanism is no longer operable. In addition, an "O" ring which slides in a bore has had problems resulting from sticking plungers which is a major cause of field failures of the electrical switch/vacuum valve assembly. Also, manufacturing tolerances result in a wide range of elasticity of the "O" rings. The elasticity can vary from 5 to 30 percent between "O" rings. This wide range of acceptable manufacturing tolerances in "O" rings causes a wide variation in the forces required to seal the vacuum port. The present invention takes this into account and can work with any acceptable "O" ring on the market.

While the foregoing invention has been described with reference to its preferred embodiments, various alterations and modifications may occur to those to skilled in the art. All such alterations and modifications are intended to fall within the scope of the appended claims.

What is claimed is:

1. A vacuum valve/switch assembly comprising:
housing having a vacuum valve port and a plunger port;
a plunger, including a plunger spring, within said housing having a plunger base and a plunger extension, said plunger movable from a first position totally within said housing to a second position wherein the plunger extension extends out of the plunger port;
the plunger spring biased within said housing to urge the plunger from the first position to the second position;
a switch contact end attached to said plunger base, the switch contact movable between the first and the second positions, a pair of cantilever switch contact legs, the switch contact end engaging and disengaging the switch contact legs to close and open a torque converter clutch circuit;
a valve stem slideably mounted within the vacuum valve port, said valve stem comprising a spring base, a guide end below the spring base and lying within the valve port, a winged end above the spring base, and an "O" ring groove approximately midway between the guide end and the winged end and below the spring base, the winged end of said valve stem engaging the plunger base when said plunger is in the second position;
an "O" ring mounted in the "O" ring groove;
a valve spring mounted on the valve stem contacting the plunger base at one end of the valve spring and contacting the spring base at the other end of the valve spring so that the valve stem is urged toward the valve port when the plunger is in its first position and the "O" ring sealably closes said valve port and when the plunger is in its second position, the valve stem is moved from the valve port by the plunger base thereby releasing the seal formed between the "O" ring and the valve port.

* * * * *